United States Patent [19]
Reinartz et al.

[11] Patent Number: 5,115,186
[45] Date of Patent: May 19, 1992

[54] TRAVEL SENSOR FOR DETERMINING THE POSITION OF A MEMBER SUCH AS A BRAKE PEDAL

[75] Inventors: Hans-Dieter Reinartz, Frankfurt am Main; Helmut Steffes, Hattersheim; Juergen Rausch, Eschborn; Stefan Risch, Wiesbaden, all of Fed. Rep. of Germany

[73] Assignee: Alfred Teves GmbH, Frankfurt am Main, Fed. Rep. of Germany

[21] Appl. No.: 512,694

[22] Filed: Apr. 23, 1990

[30] Foreign Application Priority Data

Apr. 29, 1989 [DE] Fed. Rep. of Germany ....... 3914400
Jul. 22, 1989 [DE] Fed. Rep. of Germany ....... 3924327

[51] Int. Cl.$^5$ .................. G01B 7/14; G01B 11/14; G05G 1/28
[52] U.S. Cl. .................. 324/207.22; 74/513; 250/229; 324/207.2; 324/207.26
[58] Field of Search ............ 324/714, 716, 723, 207.13-207.22, 324/207.24, 207.26; 340/870.28, 870.29, 870.31, 870.32, 870.35, 870.36, 870.38,686; 338/153, 196, 202; 137/553, 554; 74/512, 513, 514; 250/222.1, 229, 561; 200/61.76, 61.89, 341, 520

[56] References Cited

U.S. PATENT DOCUMENTS

| 1,717,051 | 6/1929 | Marshall | 340/870.38 X |
| 4,355,280 | 10/1982 | Duzich | 324/207.13 X |
| 4,406,999 | 9/1983 | Ward | 340/870.31 |
| 4,788,526 | 11/1988 | Eckstein et al. | 324/207.16 X |
| 4,818,036 | 4/1989 | Reinecke | 338/153 X |
| 4,903,002 | 2/1990 | Sachsse | 338/196 X |
| 4,914,388 | 3/1990 | Kalista et al. | 324/207.16 |

FOREIGN PATENT DOCUMENTS

| 0070108 | 6/1982 | European Pat. Off. |
| 842850 | 8/1952 | Fed. Rep. of Germany |
| 2646674 | 4/1977 | Fed. Rep. of Germany |
| 3221621 | 10/1985 | Fed. Rep. of Germany |
| 3446411 | 7/1986 | Fed. Rep. of Germany |
| 3127116 | 1/1987 | Fed. Rep. of Germany |
| 3249796 | 1/1988 | Fed. Rep. of Germany |
| 3731603 | 5/1988 | Fed. Rep. of Germany |
| 2045443 | 3/1980 | United Kingdom |

Primary Examiner—Gerard R. Strecker
Attorney, Agent, or Firm—Robert P. Seitter; J. Gordon Lewis

[57] ABSTRACT

A travel sensor for measuring mechanical quantities of motion, in particular for determining the brake pedal position, comprising a transmission unit axially slidable in a housing and comprising a measuring apparatus for generating an electric signal representative of the travel of the transmission unit. The transmission unit is formed of two mechanical transmissions elements (12, 13 and 3, 6, respectively) corresponding with each other and effecting a reduction of the introduced quantity of motions that the test signal is tapped by a reduced test travel. This provides a travel sensor of particularly short dimensions which permits to use of Hall-effect sensors.

3 Claims, 2 Drawing Sheets

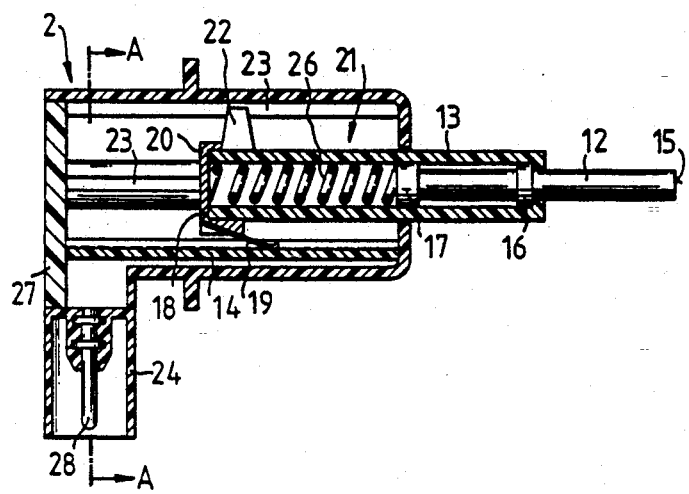
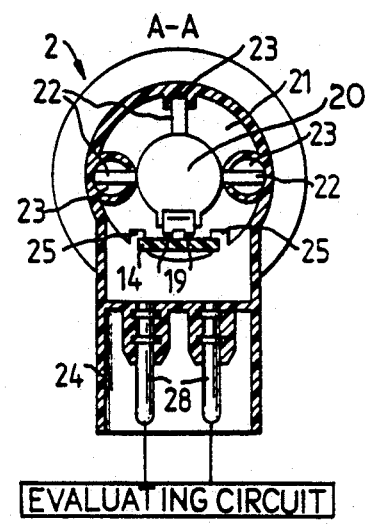
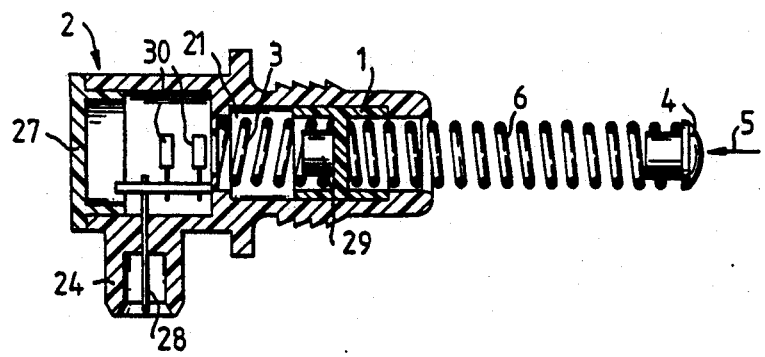

TRAVEL SENSOR FOR DETERMINING THE POSITION OF A MEMBER SUCH AS A BRAKE PEDAL

BACKGROUND OF THE INVENTION

The present invention relates to a travel sensor for measuring mechanical quantities of motion, particularly, for determining brake pedal position of a brake pedal of an automotive vehicle.

Travel sensors of this type are utilized in current practice for various reasons and for different applications. For example, brake systems can be monitored by means of such travel sensors. For measuring the pedal travel in such systems, the advance motion of the booster pistons and master brake cylinder pistons or the like advantageously can be utilized for obtaining control signals and regulating signals for anti-lock control or traction slip control.

Known travel sensors for measuring the translatory or rotational movement, for example, the brake pedal movement of an automotive vehicle, utilize the principle of voltage division, according to which the current flow through an electrical resistance is tapped by way of a displaceable collector ring. This provides a partial voltage. The transmission of kinematics from the brake pedal to the travel sensor thereby influencing the respective test voltage is performed by relatively large mechanical transmission elements as well as transmission distances which considerably increase the overall length of the sensor. For example, this may include the distance for transmitting the tappet stroke to the measurement input, and hence impair the space requirement. Considerable expenditure is required in order to obtain reliable construction elements which are safe in function particularly for frequent operation. Also, the slide contact is exposed to relatively great wear.

Therefore, it is an object of the present invention to devise a sturdy, small-sized and especially short travel sensor which can be manufactured at low cost and effort and hence is appropriate for use on medium-priced and lower-priced automotive vehicles. The sensor should accommodate relatively large travel variations with great reliability and with the necessary accuracy. Accordingly, it is a particular object to achieve in a simple and technically progressive manner a sensor of the type initially referred to.

SUMMARY OF THE INVENTION

The mechanical design of the inventive sensor requires remarkably little space. For instance, two telescopically inserted mechanical transmission elements are sufficient which therefore allows a subdivision of a relatively large total stroke into two partial strokes without having to adapt the total length of the sensor housing to the introduced relatively large compulsory stroke of actuation. In accordance with the present invention, only a considerably reduced actuating travel is required as a test travel. Owing thereto, the tapping at the printed circuit board can be reduced to half the total stroke owing to the telescopical coaction of the two mechanical transmission elements The advantage is that both the printed circuit board as well as the sensor housing can be of smaller dimensions Furthermore, the design of the sensor in accordance with the present invention provides that the arrangement of two collars on the first mechanical transmission element ensures both a friction-minimized guidance and a definite positioning in relation to the second mechanical transmission element.

Owing to simple measures lending to low-cost manufacture, it also is possible to insert the two transmission elements and the printed circuit board into the sensor housing, since it is merely required to slide the parts into their associated guiding grooves and clamp carriers in the frontally open sensor housing, so that there is no need for screw couplings or rivet-type or gluing connections. The travel sensor is characterized by a comparatively small overall length. This is because the serial arrangement of the two springs in terms of effect accomplishes a stroke reduction which varies within wide limits due to the corresponding selection of the rigidity of the resetting spring and the second spring receiving the pedal displacement, and which can be conformed to the respective requirements.

A particularly favorable embodiment of the travel sensor in accordance with the present invention is provided when the sensor incorporates, in the housing interior, an optical measuring apparatus for determining the piston position, which apparatus comprises a light source stationary in the sensor housing, a stationary light receiver and a light aperture having a variable light transmission area depending on the piston position. The piston position is measured in a non-contact manner. Thereby, one cause of wear is eliminated, that is, in contrast to travel sensors with slide contacts.

In still another favorable embodiment of the present invention, the travel sensor includes a piston of conical or similar design in the area of the measuring apparatus, and wherein the light aperture is bounded by the inside wall of the housing as well as by the contour of the piston. Adaptation of the cone and/or the piston shape in the measuring range results in confirmation of the test signal to the respective requirements within wide limits. It is of special advantage to adjust the light transmission area to the maximum value in the sensor's rest position. The light transmission area will decrease continuously on displacement of the piston. On the other hand, the light transmission area also can be adjusted to a predefined value in the rest position of the travel sensor, which value is applicable for a periodical calibration of the optical measuring apparatus or for calibration thereof to be performed before each travel measuring action. In these two embodiments, a calibrating signal is available in the rest position so that the influence of the relatively slow, temperature-responsive variations or those caused by age of the light source and the light receiver is eliminated. Infrared transmitter diodes and receiver diodes also advantageously can be utilized. To utilize the known Hall effect, the test travel should not exceed a length of roughly 10 mms so that the serial arrangement of two springs with varying rigidity permits a reduction of the introduced total stroke to a minimum possible test travel and thereby to ensure a design which is minimized with respect to wear and overall dimensions.

BRIEF DESCRIPTION OF THE DRAWING

Further features, advantages and applications of the present invention can be gathered from the following detailed description of an embodiment when taken in conjunction with the accompanying drawing wherein:

FIG. 3, is a longitudinal cross-section of the principal design of a sensor according to the present invention utilizing an inductive measurement principle;

FIG. 4 is a cross-section of the sensor in accordance with the present invention taken along the line A—A of FIG. 3; and, FIG. 5 is a longitudinal cross-section of a travel sensor in accordance with the present invention equipped with Hall-effect sensors.

DETAILED DESCRIPTION

Figure 1:
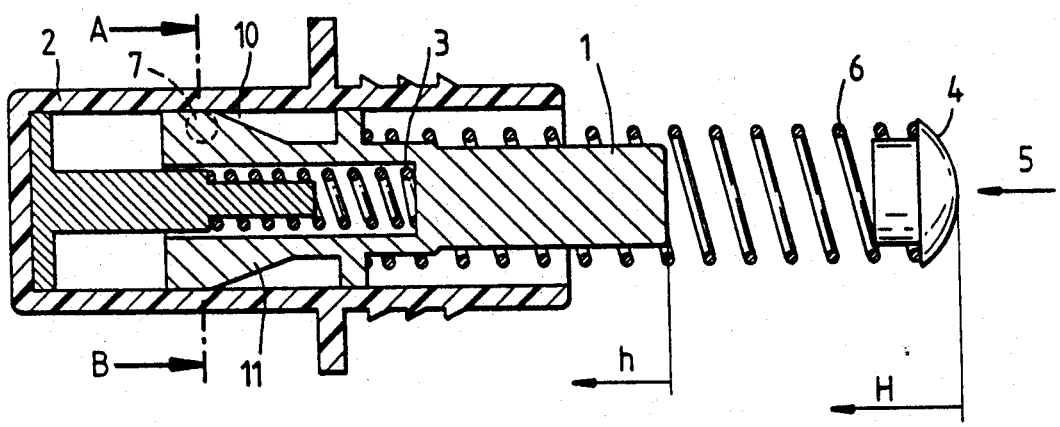
FIG. 1 is a longitudinal cross-section view through a travel sensor in accordance with the present invention.

As is shown in FIG. 1, the travel sensor comprises a movable sensor element comprised of piston 1 which is axially slidably guided in a housing 2. Piston 1 is held by a resetting spring 3, such as a compression spring, in its rest or initial position. A brake pedal or any other component part whose travel is measured acts upon an actuating element 4 which also is axially slidably guided and held in the piston axis. The force exerted on the actuating element 4 in the direction of the arrow 5 is transmitted to the piston 1 by a second spring 6 which, similar to resetting spring 3, is designed as a compression spring. The travel sensor further comprises a measuring apparatus 7 which is described in greater detail in FIG. 2.

In the preferred embodiment illustrated herein, the resetting spring 3 is of "hard-sprung" design compared to the second spring 6. The stroke H of the actuating element 4 measured therefore is reduced by the spring 3 and 6. The stroke h of the piston 1 which is determined by the measuring apparatus 7 and transverted into an analog electric signal by way of known electronic means (not shown in detail herein) hence is smaller than the stroke H of the actuating element 4. The ratio between the piston travel and/or piston stroke h and the stroke H of the actuating element 4 is defined by the rigidity of the resetting spring 3 in relation to the rigidity the second spring 6 since spring 3 resists the movement of piston 1 caused by advance of the actuating element 4.

Figure 2:
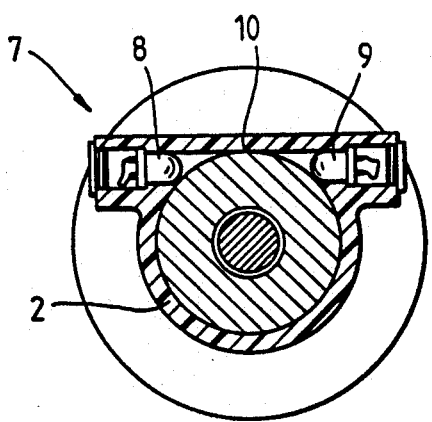
FIG. 2 is a section taken along the line A—B of the travel sensor according to FIG. 1.

According to FIG. 2, the measuring apparatus 7 comprises an infrared transmitter diode 8 and an infrared receiver diode 9. These two diodes 8, 9 are fixed in the housing 2. The instantaneous position of the piston 1 defines what portion of light of the transmitter diode 8 reaches the receiver diode 9. A light slit or light aperture 10 is formed by the inside wall of the housing 2, on the one hand, and by the contour of the piston 1 in the measuring range 11, on the other hand. To this end, the present embodiment as illustrated in FIG. 1 provides for the piston 1 to be of conical design at the level of the two diodes, whereby a V-shaped light aperture is provided This, then, depending on the instantaneous position of the piston 1, permits more or less light to reach the receiver diode 9. In the illustrated embodiment, the receiver diode 9 is shaded off entirely when the piston 1 is in its rest position. When the piston 1 is moved from this position, the quantity of light propagating through the aperture 10 rises continuously until it attains a maximum. In another embodiment which is not shown, the light aperture is at its maximum in the rest position of the travel sensor and/or the piston 1 and decreases with growing stroke H or h. The light aperture in the rest position permits constant re-calibration of the measuring apparatus 7. For instance, calibration directly before each movement of the piston 1. In the measuring range 11, piston 1 is of conical design in the illustrated embodiment, as previously described. It will be appreciated that it also is possible to choose a different contour for the piston in the measuring range 11.

Including the measuring apparatus, the travel sensor is provided in a compact design and with a short overall length. The diodes are accommodated in the sensor housing in an armored manner. Wear component parts such as slide contacts are not required, which therefore provides that the travel sensor has a long useful life, even in the event of frequent operation.

FIG. 3 illustrates the basic structure of a sensor according to the present invention. Essentially, the sensor is composed of the sensor housing 2 having a frontal-end opening 21 closed by a closure cap 27. The second mechanical transmission element 13 with the first mechanical transmission element 12 are inserted into the opening 21 so that the second transmission element 13 with its radially arranged three guiding webs 22 is axially slidable and is radially guided in the three radial guiding grooves 23 shaped in the sensor housing 2. A high rigidity spring 26 is clamped between the slide contact carrier 20, mounted on the end of the second mechanical transmission element 13, and the second collar 17 of the first transmission element 12, which positions the two transmission elements 12, 13 in relation to each other. Because of the arrangement of retaining clips 25 in the wall of the sensor housing 2, the rectangular printed circuit board 14 is partially embraced on its two longitudinal sides after it is slid into the opening 21, while it is fixed at its broad sides by the end surface of the sensor housing 2 and the closure cap 27 which acts as a stop. By way of the electrical connections 28 designed as round plugs and placed in the angular housing extension 24, a partial voltage, with respect to the maximum or total voltage applied by way of the two slide contacts 19 to the printed circuit board 14 is tapped, which voltage is between zero and the total voltage depending on the stroke of the second mechanical transmission element 13.

FIG. 3 shows the sensor in its non-activated condition in which the first tappet-shaped transmission element 12 and the hollow-cylindrical second transmission element 13 project from the sensor housing 2 with the available maximum total stroke. By activation and thus by the action of an outside force and/or caused by the pedal operation on the first tappet end 15 of the first mechanical actuating member 12, the tappet end is arranged on the right-hand side in FIG. 3. The first actuating member displaces the second mechanical transmission element 13 in the direction of the closure cap 27 by way of the spring 26 which is clamped in and acts rigidly as an elastic means between the slide contact carrier 20 and the stem end 18 of the second mechanical transmission element 13. The spring 26 acts rigidly as an elastic member between the slide contact carrier 20 and stem end 18 because it is clamped between carrier 20 and shoulder 17 so that transmission element 13 and element 12 move as a unit toward closure cap 27. As soon as the second mechanical transmission element 13 is in abutment on the closure cap 27, the maximum test travel thereby is covered by the two slide contacts 19 on the printed circuit board 14. Acting on the spring 26 is an introduced mechanical force of greater amount, for instance the force of the pedal, which causes maximum compressing of the spring until its coil-bound length is reached so that a relative movement by the second mechanical transmission element 13 takes place in the first mechanical transmission element 12. As a result, the effective stroke and/or measurement stroke of the first and second mechanical transmission elements 12, 13 is reduced, for example, to one-half the constructively predetermined total stroke of the transmission unit so that the slide contacts 19 also require only one-half the distance on the printed circuit board 14 for the purpose of signal transmission. This allows considerable shortening of the sensor housing 2 when a relatively large actuating travel is predefined. This is further accommodated by the additional rectangular bending of the sensor housing 2 in the area of the electrical plug connections 28.

Resetting of the second mechanical transmission element 13 can be performed by means of a resetting spring positioned between the closure cap 27 and the slide contact carrier 20. There is no need for resetting component parts in the sensor when the first mechanical transmission element 12 is fixed on the actuating member, such as, for instance, by means of a lug.

FIG. 4 shows a cross-section taken through the sensor housing 2 along the line A—A. Coaxially disposed to the sensor housing 2 is the almost circular slide contact carrier 20 and the two tongue-shaped slide contacts 19 cast therein. These contacts are pressed on the printed circuit board 14 by their preloading force. On both longitudinal sides, the printed circuit board 14 is partially embraced by retaining clips 25 and radially fixed thereby. The exact alignment and support of the second transmission element is effected by the narrow guiding webs 22 which have a rectangular constant cross-section which permits a radial and thus coaxial alignment of the two transmission elements 12, 13 in guiding grooves 23 of different geometry. In addition, the second mechanical transmission element 13 is provided with a guidance in the bore which penetrates the sensor housing 2 coaxially. The electrical connections 28 connected with the printed circuit board 14 are preferably cast into the housing extension 24, whereby the sensor is sealed and protected against humidity.

FIG. 5 shows an alternative embodiment for reducing the test travel by means of two springs 3, 6 corresponding with each other, as well as two Hall-effect sensors 30 which are accommodated in the sensor housing 2 and which cooperate with an axially slidable magnet 29. According to FIG. 5, the smaller opening 21 in the right-hand part of the sensor housing 2 houses the first compression spring 3 which, with its coil ends, is supported on the walls between the sensor housing 2, namely in the opening 21 subdivided into two compartments, and the magnet 29. By way of the compartments shown in longitudinal cross-section and arranged on both sides relative to the piston 1, there is provided a stationary positioning of the first compression spring 3, shown on the left side in the drawing, and the second oppositely lying compression spring 6. In order to avoid that magnet flow is interrupted in consequence of the coaxial arrangement of the magnet 29 close to the first compression spring 3, the first compression spring 3 preferably is made of a material of low magnetic conductivity. The magnet 29 preferably is bonded or screwed to the piston 1. The second compression spring 6 illustrated on the right hand in the drawing engages with its coils close to the sensor housing 2 into the helical internal thread on the right side of the piston 1 so that thereby there is ensured a simple, yet operable attachment between the piston 1 and the contact member designed as compression spring 6. An actuating member 4, preferably designed as a mushroom button, is screwed into the opposite spring end, the actuating member thereby ensuring good contacting for transmitting the introduced quantity of motion.

When the sensor which in FIG. 5 is illustrated in its non-activated condition is operated, the test travel will decrease under the action of the force on mushroom button 4 as a function of the characteristic spring rate of the first and second spring 3, 6 so that a stroke reduction is accomplished by conforming the two springs to each other. This decreases both the overall length of the sensor housing 2 and the measurement range, for example, by the employment of Hall-effect sensors 30.

What is claimed is:

1. A travel sensor for measuring mechanical quantities of motion for determining the position of the pedal of a brake system as said pedal is advanced through a travel range to operate said brake system, comprising a housing;

an actuating element engagable by said brake pedal to be moved thereby as said brake pedal is advanced through said travel range;

a sensor element movably mounted in said housing;

distance measuring means mounted in said housing generating a signal corresponding to the position of said sensor element in said housing;

transmission means interconnecting said actuating element and said sensor element to cause advancing movement of said sensor element by movement of said actuating element as said pedal is advanced through said travel range, said transmission means accommodating a reduction in the extent of advancing travel of said sensor element relative the extent of travel of said actuating element, said reduction corresponding to the level of resistance to advancing movement presented by said sensor element; and means adjacent said sensor element and acting thereon to exert a resistance force resisting advancing movement, said resistance force at a level corresponding to the extent of advancing movement of said sensor element caused by said transmission means, said means thereby acting in conjunction with said transmission means to produce a proportionately reduced movement of said sensor element relative to the extent of said advancing movement of said actuating element over at least a segment of the advancing movement of the sensor element;

whereby providing a proportional reduction of the advancing movement of said sensor element caused by advancing motion of said actuating element and brake pedal.

2. The travel sensor according to claim 1 wherein said transmission means comprises an elastically compressible element interposed between said actuating element and said sensor element, and said means proportionately reducing said travel of said sensor element comprises resistance means creating a resistance to said advancing movement of said sensor element over at least a segment of said advancing movement of said sensor element, so that said elastically compressible element is compressed as said actuating element is advanced to reduce the extent of movement of said sensor element relative to the movement of said actuating element and pedal.

3. A travel sensor as claimed in claim 2, wherein said transmission means comprises a first spring, said first spring comprising said elastically compressible element, and wherein said resistance means comprises a second spring which acts upon said sensor element so as to resist advancing travel thereof to provide said resistance, so that said sensor element travel is reduced to a predetermined portion of the travel of said actuating element and pedal, said portion corresponding to the ratio of rigidity of said first and second springs.

* * * * *